E. S. FRENCH.
Carriage.

No. 14,190.

Patented Feb. 5, 1856.

UNITED STATES PATENT OFFICE.

ELISHA S. FRENCH, OF BINGHAMTON, NEW YORK.

THREE-WHEELED VEHICLE.

Specification of Letters Patent No. 14,190, dated February 5, 1856.

*To all whom it may concern:*

Be it known that I, ELISHA S. FRENCH, of Binghamton, in the county of Broome and State of New York, have invented a new and useful Improvement in Three-Wheeled Vehicles; and I do hereby declare that the following is a full, clear, and exact description of the same, reference being had to the annexed drawings, making a part of this specification, in which—

Figure 1:
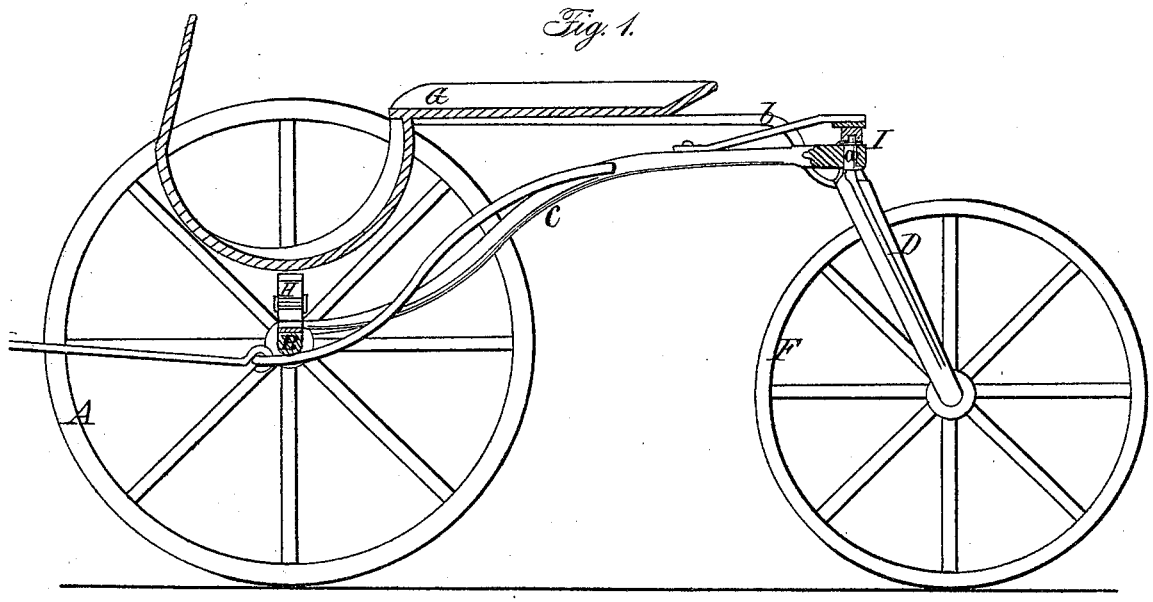
Figure 2:
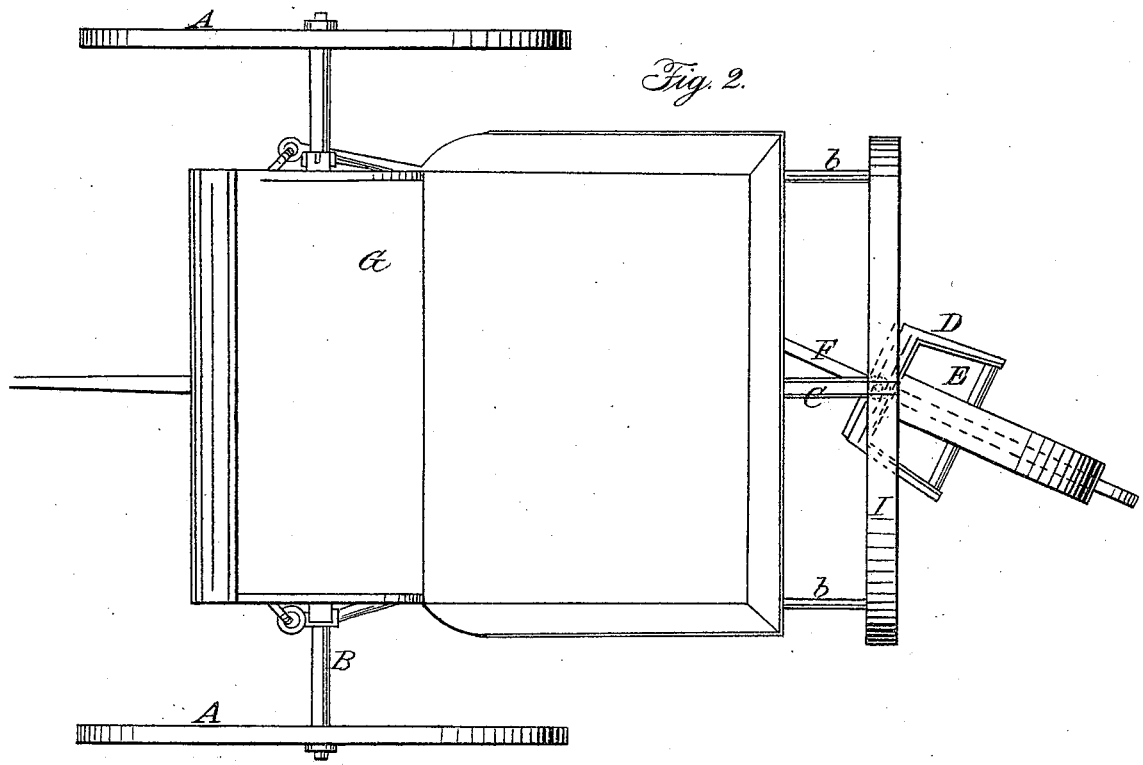

Figure 1 is a longitudinal vertical section of my improvement, the plane of section being through the center. Fig. 2 is a plan or top view of ditto.

Similar letters of reference indicate corresponding parts in the two figures.

To enable those skilled in the art to fully understand and construct my invention, I will proceed to describe it.

A A are the two front wheels of the vehicle and B is the axle, to the center of which the front end of the perch or reach C is permanently attached, said axle not being allowed to turn, as those of the usual four wheeled vehicles. The back part of the perch or reach is curved or bent upward and the back end of the perch or reach rests upon a frame D, the upper part of which has a pintle (*a*) attached to it, which pintle passes through the perch or reach and is allowed to turn freely in it. The lower end of the frame D has an axle E fitted in it, on which axle a wheel F is placed, said wheel being within the frame D and of course turning with it.

G is the body of the vehicle, the front part of which rests upon a spring H, attached to the axle B. The back part of the body has goose necked or curved iron rods (*b*) (*b*) attached to it, the outer ends of which irons are attached to the ends of a semi-elliptic spring I, which rests upon the back part of the perch or reach C.

This arrangement essentially differs from that of other three wheeled vehicles in which three wheels have been arranged in the same line crosswise of the carriage and the center wheel made a swiveling one to facilitate turning, also from other three wheeled vehicles in which two running wheels support the hind part of the carriage and a center running swivel wheel in front has served to guide and steer the vehicle in running and turning, which are not the functions of the center wheel placed at the rear in my arrangement and hung out of the vertical line of the swivel in manner of a common caster and as shown in Fig. 1 of the drawing. My arrangement has the same facilities of turning as the ordinary two wheeled gig, but it has not that objectionable weighing down at the back and shake and resembles in this respect a four wheeled vehicle and is equally secure in case of the horse slipping his traces. When running forward, the rear wheel (F) assumes the position shown in Fig. 1, it standing behind the vertical center line of the joint or swivel which connects the frame that carries it with the perch, but in turning the vehicle this rear wheel swivels to one side as it were, and in backing it moves in under the vehicle out of the way, occupying the same direction of travel, that is a parallel position with the fore wheels, but on the reverse side of the vertical line of the swivel, owing to the caster hang of it, and this is of great importance in a crowded thoroughfare, where vehicles press before and behind and it frequently, in case of accident, becomes requisite to suddenly " rein up " and back out of the way. By my arrangement I immediately occupy less room in backing and am enabled to secure myself the necessary space to turn in and get out of the way or am enabled to " back " farther, as the swiveling of the caster-hung rear wheel to the front side of the vertical line of the swivel, under the vehicle as it were, gives my vehicle additional room between it and the next vehicle in the rear to back in. The caster swivel-hang of the rear wheel will also assist the turning of the vehicle and is of some convenience in housing the vehicle as it—the rear wheel (F)—while in the forward travel of the vehicle it stands out far behind and greatly steadies the run of the vehicle, immediately occupies a reverse position when backing under shelter, and this without any special adjustment but by the act of backing under shelter, the rear wheel (F) turning itself (and the inclined pendant or frame which carried it) under the vehicle out of the way as it were in front of the vertical center line of the swivel and into a straight easy running position for the travel backward, and allowing of almost any narrow shed serving to cover the vehicle.

I am aware that three wheeled arrangements, both triangular and otherwise, to trucks and other vehicles are common and that the center wheel has been made to turn independently of the other two. Such therefore of itself or irrespective of the arrangement at the rear of the vehicle, in combination with the caster hang and operation of the swiveling wheel as specified, I do not claim; but I do claim as new and useful in three wheeled vehicles, and desire to secure by Letters Patent—

The combination and arrangement at the rear of the vehicle, substantially as shown and described, of the caster hung swiveling wheel (F) in such connection with the perch, or body, that while in the forward run of the vehicle the said wheel runs in a parallel course central to the other two (advance) wheels and at considerable distance behind them, it, in backing the vehicle, is caused to occupy a like parallel and central position with its rim or tire in direction of the travel but in closer proximity to the fore wheels and on the reverse side of the swivel, toward the front end of the vehicle and out of the way as it were, whereby additional facilities are afforded for backing the vehicle in a crowded thoroughfare and the other advantages specified are obtained.

ELISHA S. FRENCH

Witnesses:
B. N. Loomis,
Frank Loomis.